(12) United States Patent
Zhang

(10) Patent No.: US 11,876,678 B2
(45) Date of Patent: Jan. 16, 2024

(54) OPENFLOW INSTANCE CONFIGURATION

(71) Applicant: New H3C Technologies Co., Ltd., Zhejiang (CN)

(72) Inventor: Qingjun Zhang, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 180 days.

(21) Appl. No.: 17/278,578

(22) PCT Filed: Sep. 26, 2019

(86) PCT No.: PCT/CN2019/108242
§ 371 (c)(1),
(2) Date: Mar. 22, 2021

(87) PCT Pub. No.: WO2020/063776
PCT Pub. Date: Apr. 2, 2020

(65) Prior Publication Data
US 2022/0006699 A1 Jan. 6, 2022

(30) Foreign Application Priority Data
Sep. 28, 2018 (CN) .......................... 201811140453.9

(51) Int. Cl.
*H04L 41/08* (2022.01)
*H04L 12/46* (2006.01)
(Continued)

(52) U.S. Cl.
CPC ...... *H04L 41/0889* (2013.01); *H04L 12/4641* (2013.01); *H04L 41/0846* (2013.01); *H04L 45/74* (2013.01); *H04W 24/02* (2013.01)

(58) Field of Classification Search
CPC ..... H04L 12/4641; H04L 45/74; H04W 24/02
See application file for complete search history.

(56) References Cited

U.S. PATENT DOCUMENTS 11,363,457 B2 *  6/2022  Kaushik ................ H04W 12/06
2015/0200849 A1   7/2015  Wen et al.
(Continued)

FOREIGN PATENT DOCUMENTS

CN       104158916 A    11/2014
CN       104582004 A     4/2015
(Continued)

OTHER PUBLICATIONS

Moura et al., "Ethanlo:Software Defined Networking for 802.11 Wireless Netwtorks", 2015 IFIP/IEEE International Symposium on Integrated Network Management, May 11, 2015.*
(Continued)

*Primary Examiner* — Todd L Barker
(74) *Attorney, Agent, or Firm* — McDonnell Boehnen Hulbert & Berghoff LLP

(57) ABSTRACT

An AC obtains configuration information of a global instance and configuration information of an AP instance corresponding to each AP. The AC sends the configuration information of a corresponding AP instance to each AP respectively, so that each AP creates an AP instance based on the received configuration information of the AP instance, and binds an AP identifier to the created AP instance. The AC creates the global instance based on the configuration information of the global instance. The AC binds an AC identifier and an AP identifier of each AP to the global instance.

13 Claims, 7 Drawing Sheets

(51) Int. Cl.
  *H04L 41/084* (2022.01)
  *H04L 45/74* (2022.01)
  *H04W 24/02* (2009.01)

(56) References Cited

U.S. PATENT DOCUMENTS

| | | | |
|---|---|---|---|
| 2016/0072762 A1 | 3/2016 | Liang et al. | |
| 2016/0330077 A1* | 11/2016 | Jin | H04L 41/0895 |
| 2017/0086115 A1* | 3/2017 | Chung | H04L 41/40 |

FOREIGN PATENT DOCUMENTS

| | | |
|---|---|---|
| CN | 104780106 A | 7/2015 |
| CN | 104837147 A | 8/2015 |
| CN | 105591953 A | 5/2016 |
| CN | 109041086 A | 12/2018 |
| WO | 2015105985 A1 | 7/2015 |
| WO | 2017/053305 A1 | 3/2017 |

OTHER PUBLICATIONS

Namal et al., "SDN Core for Mobility between Cognitive Radio and 802.11 Networks", 2014 Eight International Conference on Next Generation Apps, Services, and Technologies, Sep. 10, 2014.*

Nakuci et al., "WiFi Network Virtualization to Control the Connectivity of a Target Service", IEEE Transactions on Network and Service Management, vol. 12, Issue 2, Jun. 2015.*

International Search Report dated Jan. 8, 2020, issued in connection with International Application No. PCT/CN2019/108242, filed on Sep. 26, 2019, 5 pages.

Written Opinion dated Jan. 8, 2020, issued in connection with International Application No. PCT/CN2019/108242, filed on Sep. 26, 2019, 4 pages.

HP, "HP OpenFlow Switches", OpenFlow Configuration Guide, 2012, 50 pages.

* cited by examiner

OPENFLOW INSTANCE CONFIGURATION

CROSS-REFERENCE TO RELATED APPLICATIONS

The present application is a U.S. National Phase Application under 35 U.S.C. § 371 of International Application No. PCT/CN2019/108242 filed Sep. 26, 2019, which claims priority to Chinese Patent Disclosure No. 201811140453.9, filed with the China National Intellectual Property Administration, on Sep. 28, 2018 and entitled "a method and apparatus for configuring an OpenFlow instance", which are incorporated into the disclosure by reference in their entirety.

BACKGROUND

In the architecture of Software Defined Network (SDN), the communication interface standard between a controller and a forwarding layer is defined as OpenFlow, and the OpenFlow can separate a control plane from a data plane.

If the OpenFlow standard is applied to a wireless network, when a terminal accesses an access point (AP), the AP creates a wireless virtual interface and configures an instance for the wireless virtual interface; when the terminal is disconnected from the AP, the AP needs to delete the instance configured for the wireless virtual interface.

DETAILED DESCRIPTION

The technical solutions in the examples of the disclosure will be described clearly and completely below in combination with the accompanying drawings in the examples of the disclosure. Obviously, the described examples are merely a part of and not all of the examples of the disclosure. All other examples obtained by those skilled in the art based on the examples of the disclosure without creative efforts shall fall within the scope of protection of the disclosure.

Figure 1:
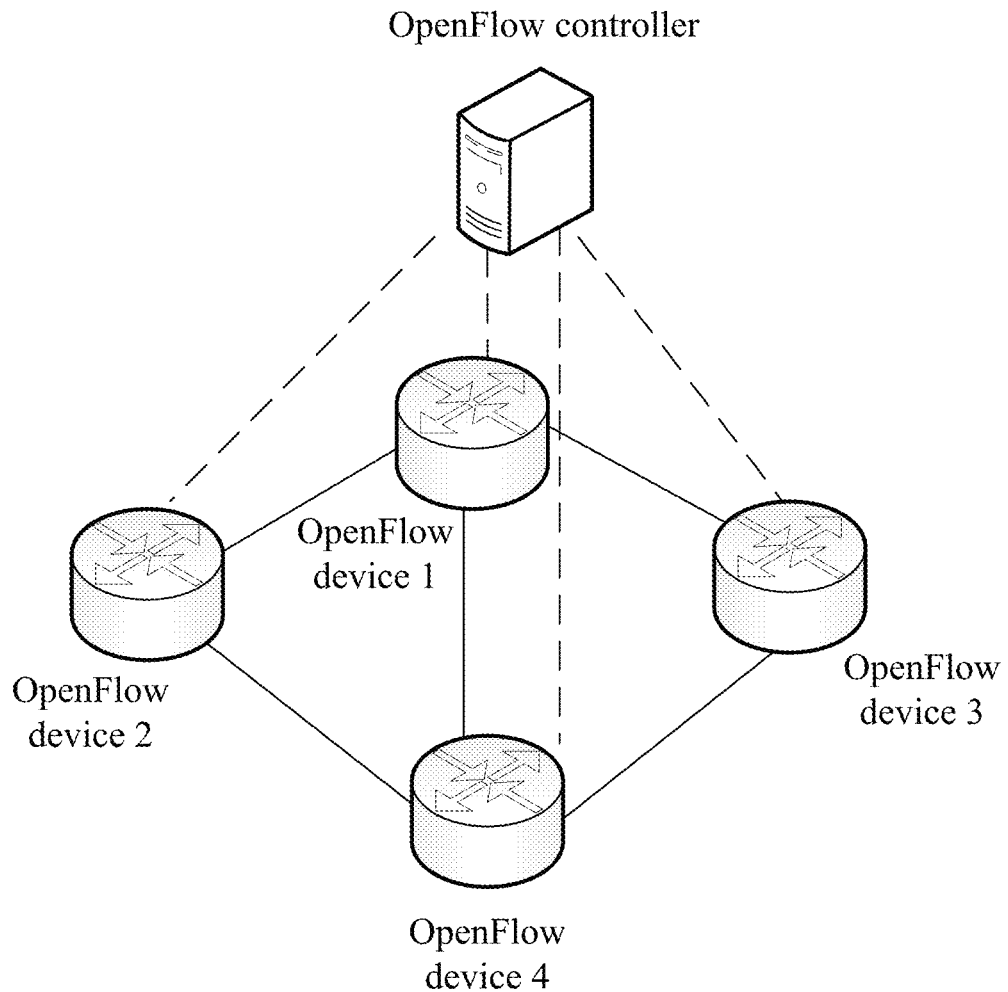
FIG. 1 is a schematic diagram of the architecture of an OpenFlow network provided by an example of the disclosure.

An example of the disclosure is applied to an OpenFlow network. As shown in FIG. 1, FIG. 1 is a schematic diagram of architecture of an OpenFlow network provided by an example of the disclosure. The OpenFlow network includes an OpenFlow device, an OpenFlow controller, and a secure channel between the OpenFlow device and the OpenFlow controller.

The OpenFlow controller is the control center of the virtual network, which may generate a flow table based on a user configuration or a protocol running dynamically, and send the flow table to the OpenFlow device.

The OpenFlow device is configured for receiving the flow table sent by the OpenFlow controller and processing messages based on the flow table. The OpenFlow device is also configured for reporting device status and events, such as opening up an interface or closing down an interface, to the OpenFlow controller. The OpenFlow device may be an Access Controller (AC) or AP.

The dotted lines in FIG. 1 are secure channels for supporting communication between the OpenFlow controller and the OpenFlow devices.

Figure 2:
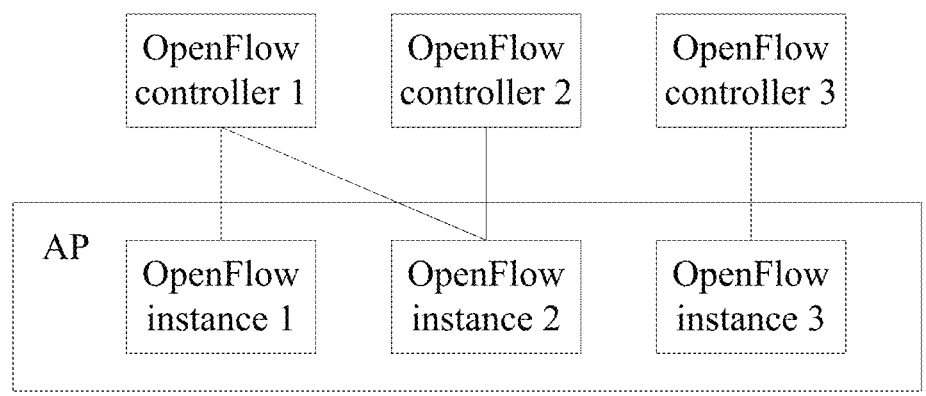
FIG. 2 is an exemplary schematic diagram of an OpenFlow multi-instances provided by an example of the disclosure.

Currently, multiple OpenFlow instances may be configured on an OpenFlow device, an OpenFlow instance may be connected to multiple OpenFlow controllers, and an OpenFlow controller may also be connected to multiple OpenFlow instances. As shown in FIG. 2, if there are three ports on an OpenFlow device, each port corresponds to an OpenFlow instance, namely an OpenFlow instance 1, an OpenFlow instance 2 and an OpenFlow instance 3, respectively. The OpenFlow instance 1 is connected to the OpenFlow controller 1, the OpenFlow instance 2 is connected to the OpenFlow controller 1 and the OpenFlow controller 2, and the OpenFlow instance 3 is connected to the OpenFlow controller 3.

If the OpenFlow device in FIG. 2 is an AP, when a terminal accesses the AP or the terminal is disconnected from the AP, the wireless virtual interface between the AP and the terminal changes. If the wireless virtual interface between the AP and the terminal changes frequently, the OpenFlow controller frequently configures an instance for the wireless virtual interface of the AP.

For example, when the network is unstable, the terminal would be frequently connected to and disconnected from the AP; or, when the terminal is at the edge of the signal coverage of the AP, the terminal would also be frequently connected to and disconnected from the AP.

For example, after the terminal accesses the AP, the AP reports the wireless virtual interface created for the terminal to the OpenFlow controller, and the OpenFlow controller configures an instance for the wireless virtual interface. However, within a short period of time, the terminal is disconnected from the AP, the AP deletes the wireless virtual interface, and the OpenFlow controller needs to delete the instance configured for the wireless virtual interface. If the terminal is repeatedly connected to the AP and is then repeatedly disconnected from the AP, it will result in a configuration oscillation of the OpenFlow controller. It can be seen that the implementation of the OpenFlow multi-instances on a wireless device is complicated in the prior art.

Figure 3:
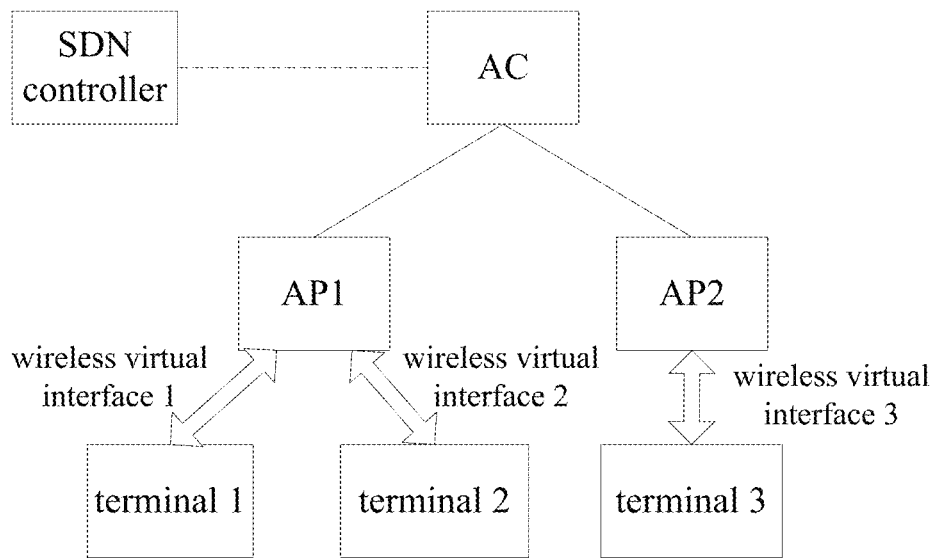
FIG. 3 is a schematic diagram of a wireless network architecture provided by an example of the disclosure.

In order to solve the above problem, the example of the disclosure provides a configuration of OpenFlow instance, which is applied to a wireless network. The wireless network includes an SDN controller, an AC, multiple APs, and multiple terminals. The multiple APs access the AC, and are managed together by the AC. The multiple terminals access the AP, and the AP provides services for the terminals. As shown in FIG. 3, FIG. 3 exemplarily shows an SDN controller, an AC, an AP1 and an AP2 connected to the AC.

The SDN controller may communicate with the AC or the APs through the OpenFlow protocol. In the example of the disclosure, the SDN controller may also be referred to as an OpenFlow controller. Optionally, the SDN controller may be connected to the AC via a switch. The AP1 may serve a terminal 1 and a terminal 2. The AP1 communicates with the terminal 1 via a wireless virtual interface 1, and communicates with the terminal 2 via a wireless virtual interface 2. The AP2 serves a terminal 3, and communicates with the terminal 3 via a wireless virtual interface 3.

In order to solve the problem that the implementation of the OpenFlow multi-instances on the wireless device is complicated, in the example of the disclosure, the SDN controller may respectively assign an OpenFlow instance for each of the APs, and the wireless virtual interface created by the AP may be bound to the OpenFlow instance corresponding to the AP. Therefore, when the wireless virtual interface of the AP changes, the OpenFlow controller does not need to re-assign an OpenFlow instance, and thus the complication for implementing the OpenFlow multi-instances on the wireless device is reduced.

Figure 4:
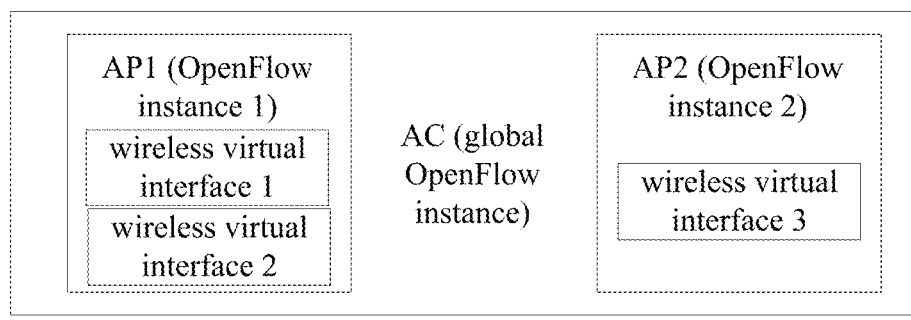
FIG. 4 is an exemplary schematic diagram of a configuration result of OpenFlow instances provided by an example of the disclosure.

Combined with the architecture of the wireless network shown in FIG. 3, in the example of the disclosure, an instance configured for the wireless device in FIG. 3 is shown in FIG. 4, wherein an identifier of the AP1 is bound to the OpenFlow instance 1, and an identifier of the AP2 is bound to OpenFlow instance 2. The identifier of the AP1 and the identifier of the AP2 are bound to a global OpenFlow instance.

When a terminal accesses the AP1, each of wireless virtual interfaces created by the AP1 corresponds to the OpenFlow instance 1. For example, the wireless virtual interface 1 and the wireless virtual interface 2 in FIG. 3 both correspond to the OpenFlow instance 1. When a terminal accesses the AP2, each of wireless virtual interfaces created by the AP2 corresponds to the OpenFlow instance 2. For example, the wireless virtual interface 3 in FIG. 3 corresponds to the OpenFlow instance 2.

Optionally, in a possible implementation, the SDN controller may also create multiple instances for an AP, and pre-establish a correspondence between features of wireless virtual interface and instances. The feature of a wireless virtual interface is the feature of a terminal accessed via the wireless virtual interface. The feature of a terminal may specifically be a brand, a model number, or the like, of the terminal. For example, an instance A and an instance B are created on the AP1, a wireless virtual interface for connecting to terminals of brand 1 and brand 2 is preset to correspond to the instance A, and a wireless virtual interface for connecting to terminals of brand 3 and brand 4 is present to correspond to the instance B.

A method for configuring an OpenFlow instance provided by the example of the disclosure is described below with reference to the specific examples.

Figure 5:
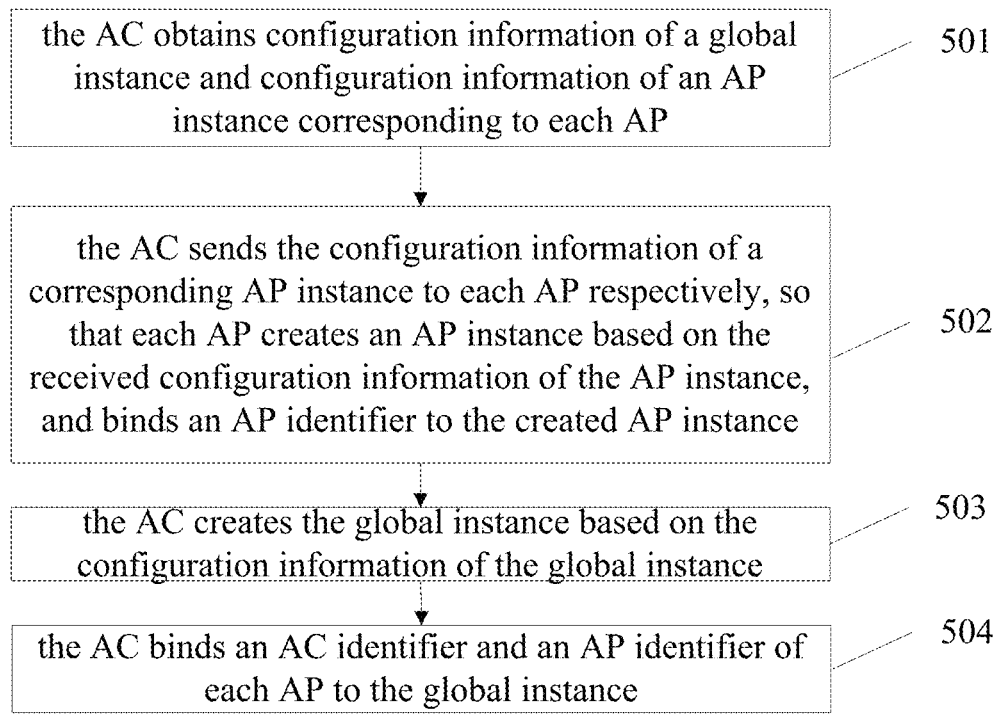
FIG. 5 is a flowchart of a method for configuring an OpenFlow instance provided by an example of the disclosure.

As shown in FIG. 5, the example of the disclosure provides a method for configuring an OpenFlow instance. The method is performed by an AC, and at least one AP accesses the AC. The method includes the following operations.

At block S501, the AC obtains configuration information of a global instance and configuration information of an AP instance corresponding to each AP.

In the example of the disclosure, the global instance is a global OpenFlow instance created by the AC based on the configuration information of the global instance, which is abbreviated as the global instance. The AP instance is an OpenFlow instance created by the AP based on the configuration information of the AP instance, which is abbreviated as the AP instance. Hereinafter, abbreviations are used for illustration.

Specifically, the AC receives configuration information of a global instance that is input by a user or sent by the SDN controller. The configuration information of the global instance includes information for creating the global instance and an Internet Protocol (IP) address and a port number of the SDN controller, and may also include an IP address and a port number of the AC.

The AC also receives configuration information of an AP instance corresponding to each AP input by the user or sent by the SDN controller.

For example, combining with FIG. 3, the AC receives the configuration information of the AP instance 1 corresponding to the AP1 and the configuration information of the AP instance 2 corresponding to the AP2.

At block S502, the AC sends the configuration information of a corresponding AP instance to each AP respectively, so that each AP creates an AP instance based on the received configuration information of the AP instance, and binds an AP identifier to the created AP instance.

For example, in FIG. 3, the AC sends the configuration information of the AP instance 1 to the AP1, and sends the configuration information of the AP instance 2 to the AP2. After the AP1 and AP2 receive the configuration information of AP instances, AP1 creates the AP instance 1 and AP2 creates the AP instance 2. In addition, the identifier of the AP1 is bound to the AP instance 1, and the identifier of the AP2 is bound to the AP instance 2.

At block S503, the AC creates the global instance based on the configuration information of the global instance.

At block S504, the AC binds an AC identifier and an AP identifier of each AP to the global instance.

Exemplarily, as shown in FIG. 4, the identifier of the AP1 in FIG. 3 is bound to the AP instance 1, the identifier of the AP2 is bound to the AP instance 2, and the identifier of the AP1 and the identifier of the AP2 are both bound to the global instance.

Using the method for configuring an OpenFlow instance provided by the example of the disclosure, the AC creates the global instance based on the configuration information of the global instance, binds the identifier of the AC and the identifier of each AP to the global instance, and binds the identifier of each AP to the AP instance created by each AP. Even if the wireless virtual interface in an AP changes, the binding relation between the identifier of the AP and the OpenFlow instance does not change, and thus it is not needed to re-configure an instance. Compared with the method for configuring an instance based on the wireless virtual interface in the prior art, the method for configuring an instance applied in the example of the disclosure can reduce the configuration workload, and can be implemented relatively simply.

After the AC creates the global instance, the AC may also receive flow entries sent by the SDN controller to process messages based on the flow entries.

In a first possible implementation, for a centralized forwarding mode, the process may be performed based on the following methods.

The AC receives a first upstream flow entry sent by the SDN controller, wherein, the first upstream flow entry is used by the AC to perform centralized forwarding on upstream data messages.

The first upstream flow entry includes a destination IP address, a virtual local area network (VLAN) value, a destination media access control (MAC) address, and an identifier of a wireless virtual interface via which a terminal accesses an AP.

Optionally, the first upstream flow entry may be expressed as: an OpenFlow basic matching domain (a destination IP address+a VLAN value+a destination MAC address)+an extended matching domain (an identifier of a wireless virtual interface via which a terminal accesses an AP)+Output (a destination IP address).

When the AC receives an upstream data message forwarded by a first AP, and a destination IP address, a VLAN value and a destination MAC address included in the upstream data message match respectively with the destination IP address, the VLAN value and the destination MAC address included in the first upstream flow entry, the AC determines whether the wireless virtual interface via which the first AP receives the upstream data message is a wireless virtual interface corresponding to the identifier included in the first upstream flow entry. If the wireless virtual interface via which the first AP receives the upstream data message is the wireless virtual interface corresponding to the identifier included in the first upstream flow entry, the AC forwards the upstream data message to the destination IP address based on the first upstream flow entry.

In other words, if a upstream data message received by the AC matches both with the basic matching domain and the extended matching domain in the first upstream flow entry, the AC forwards the upstream data message based on the "output" in the first upstream flow entry.

In this implementation, the AC may also receive a first downstream flow entry sent by the SDN controller, wherein, the first downstream flow entry is used by the AC to perform centralized forwarding on downstream data messages.

The first downstream flow entry includes a destination IP address, a VLAN value, a destination MAC address and an AP identifier.

Optionally, the first downstream flow entry may be expressed as: an OpenFlow basic matching domain (a destination IP address+a VLAN value+a destination MAC address)+an extended matching domain (an AP identifier)+Output (an identifier of a wireless interface connected to the AP).

When a downstream data message is received, and a destination IP address, a VLAN value and a destination MAC address included in the downstream data message match respectively with the destination IP address, the VLAN value and the destination MAC address included in the first downstream flow entry, the AC determines whether the first AP for forwarding the downstream data message is an AP corresponding to the AP identifier in the first downstream flow entry. If the first AP for forwarding the downstream data message is the AP corresponding to the AP identifier in the first downstream flow entry, the AC sends the downstream data message to the first AP via the wireless interface connected to the first AP based on the first downstream flow entry.

In other words, if a downstream data message received by the AC matches both with the basic matching domain and the extended matching domain in the first downstream flow entry, the AC forwards the downstream data message based on the "output" in the first downstream flow entry.

In a second possible implementation, for a local forwarding mode, the process may be performed based on the following methods.

The AC receives a second upstream flow entry sent by the SDN controller, wherein, the second upstream flow entry is used by the AC to locally forward upstream data messages.

The second upstream flow entry includes a source IP address, a VLAN value, a source MAC address and an AP identifier.

Optionally, the second upstream flow entry may be expressed as: an OpenFlow basic matching domain (a source IP address+a VLAN value+a source MAC address)+an extended matching domain (an AP identifier)+Output (a destination IP address).

When the AC receives an upstream data message sent by a second AP, and a source IP address, a VLAN value and a source MAC address included in the upstream data message match respectively with the source IP address, the VLAN value and the source MAC address included in the second upstream flow entry, the AC determines whether the second AP is an AP corresponding to the AP identifier in the second upstream flow entry. If the second AP is the AP corresponding to the AP identifier in the second upstream flow entry, the AC forwards the upstream data message based on the second upstream flow entry. Specifically, the AC forwards the upstream data message to the destination IP address based on the second upstream flow entry.

In other words, if an upstream data message received by the AC matches both with the basic matching domain and the extended matching domain in the second upstream flow entry, the AC forwards the upstream data message based on the "output" in the second upstream flow entry.

In this implementation, the AC may also receive a second downstream flow entry sent by the SDN controller. The second downstream flow entry is used by the AC to locally forward downstream data messages.

The second downstream flow entry includes a destination IP address, a VLAN value, a destination MAC address and an AP identifier.

Optionally, the second downstream flow entry may be expressed as: an OpenFlow basic matching domain (a destination IP address+a VLAN value+a destination MAC address)+an extended matching domain (an AP identifier)+Output (an AP identifier).

When a downstream data message is received, and a destination IP address, a VLAN value and a destination MAC address included in the downstream data message match respectively with the destination IP address, the VLAN value and the destination MAC address included in the second downstream flow entry, the AC determines whether the second AP for forwarding the downstream data message is an AP corresponding to the AP identifier in the second downstream flow entry. If the second AP for forwarding the downstream data message is the AP corresponding to the AP identifier in the second downstream flow entry, the AC sends the downstream data message to the second AP based on the second downstream flow entry.

In other words, if a downstream data message received by the AC matches both with the basic matching domain and the extended matching domain in the second downstream flow entry, the AC forwards the downstream data message based on the "output" in the second downstream flow entry.

It can be understood that, when using the local forwarding mode, the AP needs to forward and encapsulate messages, and thus on the basis of the foregoing second implementation, the SDN controller may also send a flow entry to an AP via the AC, so that the AP processes messages based on the received flow entry. The specific implementation process is as follows.

The AC receives a third upstream flow entry sent by the SDN controller, and then the AC sends the third upstream flow entry to the second AP, so that, when the second AP receives an upstream data message sent by a terminal, and a wireless virtual interface via which the second AP receives the upstream data message is a wireless virtual interface corresponding to an identifier included in the third upstream flow entry, the second AP forwards the upstream data message to the AC based on the third upstream flow entry.

The third upstream flow entry is used by the second AP to locally forward upstream data messages. The third upstream flow entry includes an identifier of a wireless virtual interface, wherein, the wireless virtual interface is used by the terminal to access the second AP.

Optionally, the third upstream flow entry may be expressed as: an OpenFlow extended matching domain (an identifier of a wireless virtual interface)+Output (an AC identifier).

In addition, the AC receives a third downstream flow entry sent by the SDN controller, and then the AC sends the third downstream flow entry to the second AP, so that, when the second AP receives a downstream data message sent by the AC, and a destination MAC address included in the downstream data message is the MAC address included in the third downstream flow entry, the second AP forwards the downstream data message to the terminal based on the third downstream flow entry.

The third downstream flow entry is used by the second AP to locally forward downstream data messages. The third downstream flow entry includes a destination MAC address.

The third downstream flow entry further includes an identifier of a wireless virtual interface, wherein, the wireless virtual interface is used by the terminal to access the second AP. The AC specifically forwards the downstream data message via the wireless virtual interface corresponding to the identifier in the third downstream flow entry.

Optionally, the third downstream flow entry may be expressed as: an OpenFlow basic matching domain (a destination MAC address)+Output (an identifier of a wireless virtual interface).

Figure 6:
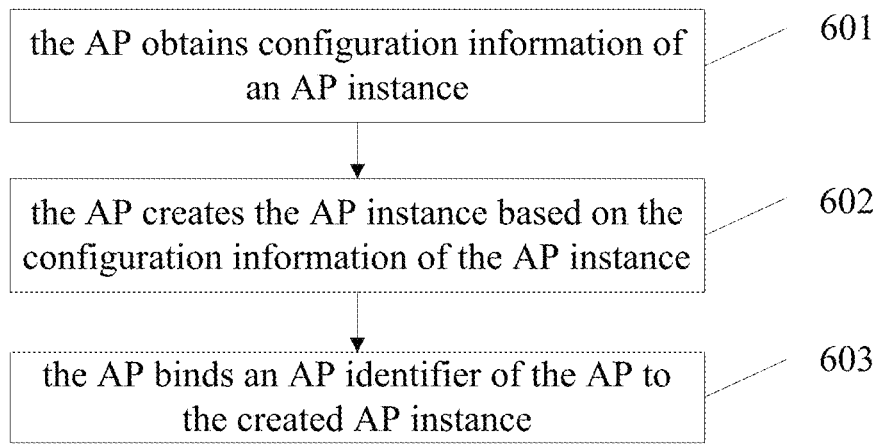
FIG. 6 is a flowchart of another method for configuring an OpenFlow instance provided by an example of the disclosure.

Corresponding to the example shown in FIG. 5, an example of the disclosure further provides a method for configuring an OpenFlow instance, which is executed by an AP. As shown in FIG. 6, the method includes the following operations.

At block S601, the AP obtains configuration information of an AP instance.

The AP receives configuration information of an AP instance input by a user, or the AP receives configuration information of an AP instance that is send by the SDN controller to the AC and then forwarded by the AC to the AP. The AP instance is an OpenFlow instance created by the AP based on the configuration information of the AP instance, which is abbreviated as the AP instance. Hereinafter, abbreviations are used for illustration.

Optionally, the configuration information of an AP instance includes information for creating the AP instance and an IP address and a port number of the SDN controller, and may also include an IP address and a port number of the AP.

At block S602, the AP creates the AP instance based on the configuration information of the AP instance.

At block S603, the AP binds an AP identifier of the AP to the created AP instance.

After the AP binds the AP identifier of the AP to the created AP instance, a wireless virtual interface created by the AP for connecting to a terminal also corresponds to the AP instance.

Using the method for configuring an OpenFlow instance provided by the example of the disclosure, the AP creates an AP instance based on the configuration information of the AP instance, and binds the AP identifier of the AP to the created AP instance, that is, the AP corresponds to the AP instance. Even if the wireless virtual interface on the AP changes, the binding relation between the AP identifier and the AP instance does not change. The change of the wireless virtual interface on the AP does not affect the assignment of the AP instance. That is, when the wireless virtual interface of the AP changes, it is not needed to re-configure an instance. Compared with the method for configuring an instance based on a wireless virtual interface in the prior art, the method for configuring an instance based on an AP applied in the example of the disclosure can reduce the configuration workload, and can be implemented relatively simply.

After the AP creates the AP instance, in a case where the AP supports local forwarding, the AP receives an upstream flow entry and a downstream flow entry sent by the AC. The upstream flow entry is the third upstream flow entry in the foregoing example, and the downstream flow entry is the third downstream flow entry in the foregoing example. The upstream flow entry is used by the AP to locally forward upstream data messages. The downstream flow entry is used by the AP to locally forward downstream data messages.

The upstream flow entry includes an identifier of a wireless virtual interface. The wireless virtual interface is used by a terminal to access the AP, that is, the terminal connects to the AP via the wireless virtual interface.

Optionally, the upstream flow entry may be expressed as: an OpenFlow extended matching domain (an identifier of a wireless virtual interface)+Output (an AC identifier).

When the AP receives an upstream data message sent by the terminal, and the wireless virtual interface via which the AP receives the upstream data message is a wireless virtual interface corresponding to the identifier included in the upstream flow entry, the AP forwards the upstream data message to the AC based on the upstream flow entry.

In other words, if a upstream data message received by the AP matches with the extended matching domain in the upstream flow entry, the AP forwards the upstream data message based on the "output" in the upstream flow entry, that is, the AP, based on the AC identifier in the "output", forwards the upstream data message to the AC corresponding to the AC identifier.

The downstream flow entry includes a destination MAC address. Optionally, the downstream flow entry may be expressed as: an OpenFlow basic matching domain (a destination MAC address)+Output (an identifier of a wireless virtual interface).

When the AP receives a downstream data message sent by the AC, and a destination MAC address included in the downstream data message is the destination MAC address in the downstream flow entry, the AP forwards the downstream data message to the terminal based on the downstream flow entry.

Specifically, the AP forwards the data message to the terminal via the wireless virtual interface corresponding to the identifier in the downstream flow entry.

In other words, if a downstream data message received by the AP matches with the basic matching domain in the downstream flow entry, the AP forwards the downstream data message based on the "output" in the downstream flow entry, that is, the AP, based on the identifier of the wireless virtual interface in the "output", forwards the downstream data message to the wireless virtual interface corresponding to the identifier.

The method for configuring an OpenFlow instance provided by the example of the disclosure is described below with specific examples. In conjunction with FIG. 3 and FIG. 4, the AC may create a global instance, and bind the identifier of the AC, the identifier of the AP1 and the identifier of the AP2 to the global instance. The AP1 creates an AP instance 1 and binds the identifier of the AP1 to the AP instance 1. The AP2 creates an AP instance 2 and binds the identifier of the AP2 to the AP instance 2. It is assumed that the AP1 supports centralized forwarding and the AP2 supports the local forwarding.

Figure 7:
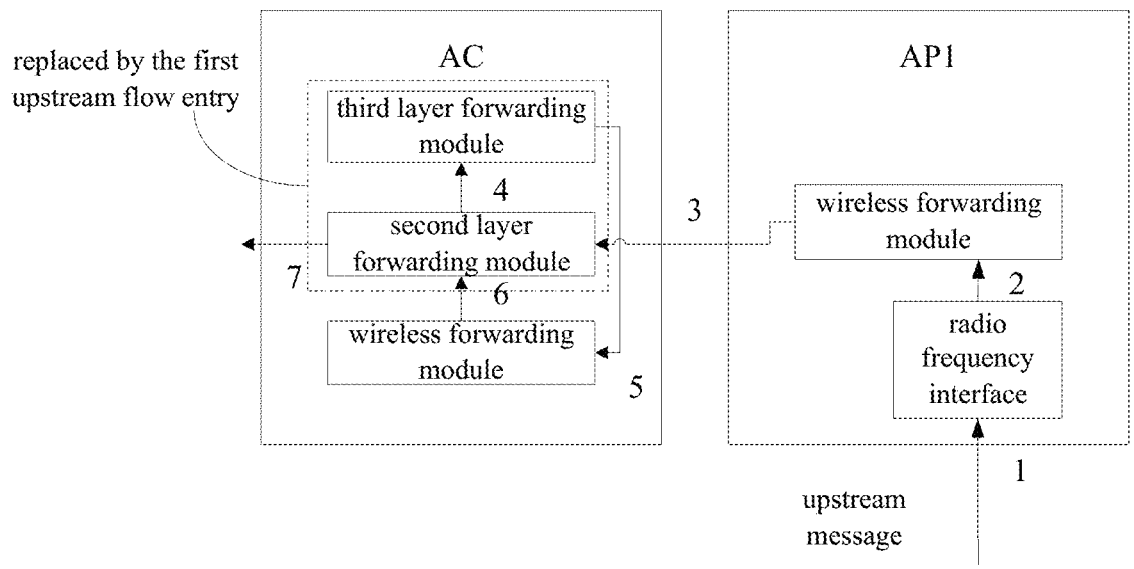
FIG. 7 is a schematic diagram of a centralized upstream forwarding process provided by an example of the disclosure.

As shown in FIG. 7, FIG. 7 is an exemplary schematic diagram of a centralized upstream forwarding process. In the scenario of FIG. 7, the AP1 supports centralized forwarding, and the SDN controller does not need to send an upstream flow entry to the AP1, and may send a first upstream flow entry to the AC: an OpenFlow basic matching domain (a destination IP address+a VLAN value+a destination MAC address)+an extended matching domain (an identifier of a wireless virtual interface via which a terminal accesses an AP)+Output (a destination IP address).

Currently, after the AP1 receives an upstream data message sent by a terminal 1 via a radio frequency interface, the AP1 forwards the upstream data message based on the direction of arrows shown in FIG. 7. That is, the AP1 forwards the upstream data message to a second layer forwarding module of the AC by using a wireless forwarding mode. The second layer forwarding module of the AC then forwards the upstream data message to a third layer forwarding module. The third layer forwarding module then forwards the upstream data message to a wireless forwarding module of the AC. Then, the wireless forwarding module sends the upstream data message to the second layer forwarding module, and the second layer forwarding module forwards the upstream data message based on the destination IP address in the upstream data message.

In the example of the disclosure, in FIG. 7, the second layer forwarding module and the third layer forwarding module may be replaced by the first upstream flow entry of the AC. That is, after the AP1 receives the upstream data message sent by the terminal 1, the AP1 forwards the upstream data message to the wireless forwarding module of the AC by using the wireless forwarding mode.

If the AC determines that a destination IP address, a VLAN value and a destination MAC address in the upstream data message match with the basic matching domain in the first upstream flow entry, and the wireless virtual interface via which the AP1 receives the upstream data message is a wireless virtual interface corresponding to the identifier in the first upstream flow entry, the AC determines that the upstream data message matches with the first upstream flow entry, and then the AC forwards the upstream data message to the destination IP address through the wireless forwarding module based on the first upstream flow entry.

Figure 8:
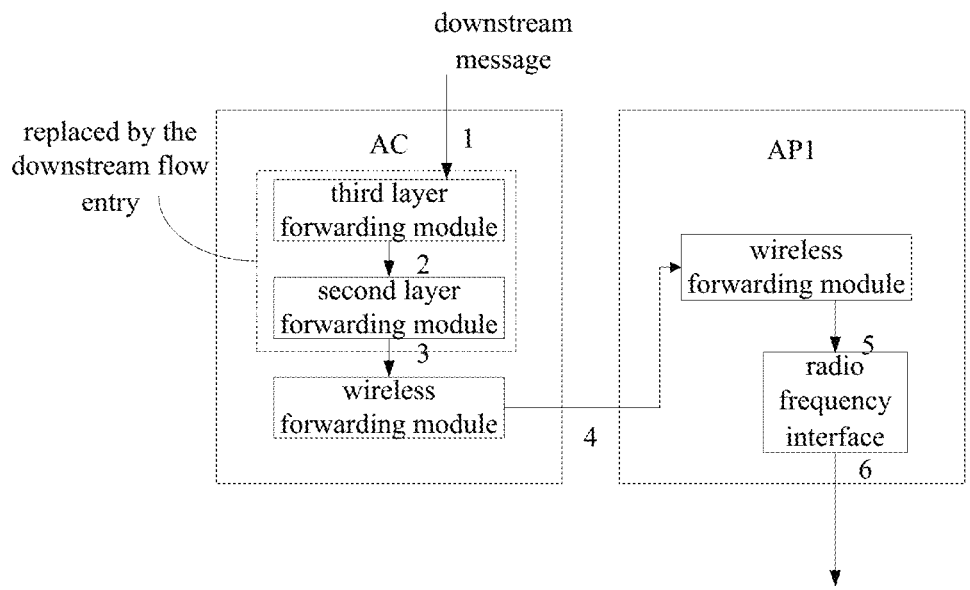
FIG. 8 is a schematic diagram of a centralized downstream forwarding process provided by an example of the disclosure.

As shown in FIG. 8, FIG. 8 is an exemplary schematic diagram of a centralized downstream forwarding process. In the scenario of FIG. 8, the AP1 supports centralized forwarding, and the SDN controller does not need to send an downstream flow entry to the AP1, and may send a first downstream flow entry to the AC: an OpenFlow basic matching domain (a destination IP address+a VLAN value+a destination MAC address)+an extended matching domain (an AP identifier)+Output (an identifier of a wireless interface connected to an AP).

Currently, after the AC receives a downstream data message, the AC may forward the downstream data message based on the sequence of the arrows shown in FIG. 8. In the example of the disclosure, in FIG. 8, the second layer forwarding module and the third layer forwarding module may be replaced by the downstream flow entry of the AC. That is, after the AC receives the downstream data message, if the AC determines that a destination IP address, a VLAN value and a destination MAC address in the downstream data message match with the basic matching domain in the downstream flow entry, and the AP1 for forwarding the downstream data message is an AP corresponding to the AP identifier in the first downstream flow entry, the AC determines that the downstream data message matches with the first downstream flow entry, and then the AC sends the downstream data message to the AP1 via a wireless interface connected to an AP based on the first downstream flow entry, and then the AP1 forwards the downstream data message to the terminal.

Figure 9:
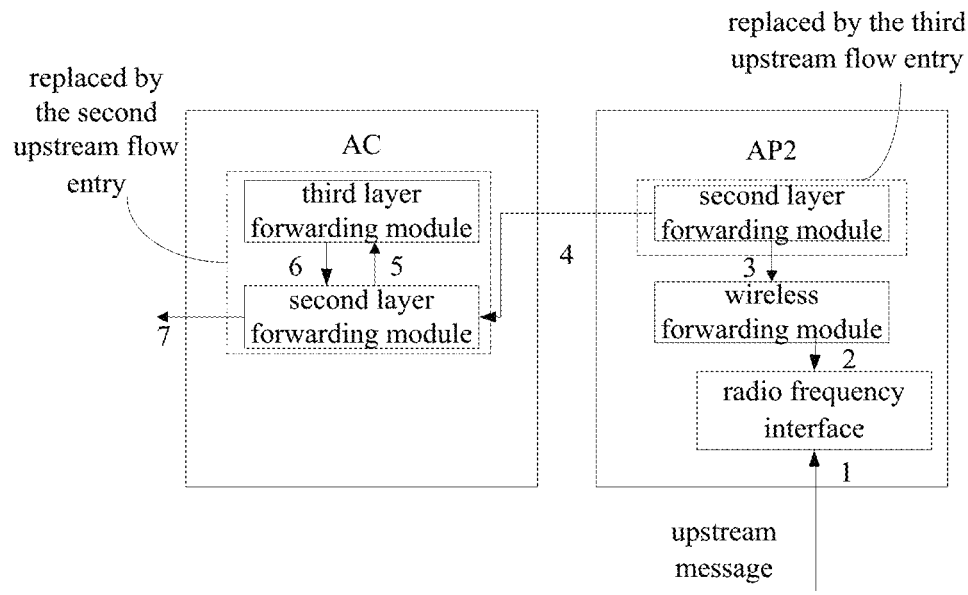
FIG. 9 is a schematic diagram of a locally upstream forwarding process provided by an example of the disclosure.

As shown in FIG. 9, FIG. 9 is an exemplary schematic diagram of a local upstream forwarding process. In the scenario of FIG. 9, the AP2 supports local forwarding, and the second upstream flow entry received by the AC is: an OpenFlow basic matching domain (a source IP address+a VLAN value+a source MAC address)+an extended matching domain (an AP identifier)+Output (a destination IP address); the third upstream flow entry received by the AP2 is: an OpenFlow extended matching domain (an identifier of a wireless virtual interface)+Output (an AC identifier).

Currently, after the AP2 receives an upstream data message from a terminal, the AC may forward the upstream data message based on the sequence of the arrows shown in FIG. 9. In the example of the disclosure, in FIG. 9, the second layer forwarding module and the third layer forwarding module of the AC may be replaced by the second upstream flow entry of the AC. In FIG. 9, the second layer forwarding module of the AP2 may be replaced by the second upstream flow entry of the AP2.

That is, after the AP2 receives the upstream data message from the terminal, if the wireless virtual interface via which the AP2 receives the upstream data message is a wireless virtual interface corresponding to the identifier in the extended matching domain of the third upstream flow entry, the AP2 determines that the upstream data message matches with the third upstream flow entry in the AP2, and then the AP2 forwards the upstream data message to the AC based on the third upstream flow entry. After the AC receives the upstream data message, if the AC determines that a destination IP address, a VLAN value and a destination MAC address in the upstream data message match with the basic matching domain in the second upstream flow entry stored in the AC, and the AP2 sending the upstream data message is an AP corresponding to the AP identifier in the second upstream flow entry, the AC determines that the upstream data message matches with the second upstream flow entry, and then the AC forwards the upstream data message to the destination IP address based on the second upstream flow entry.

Figure 10:
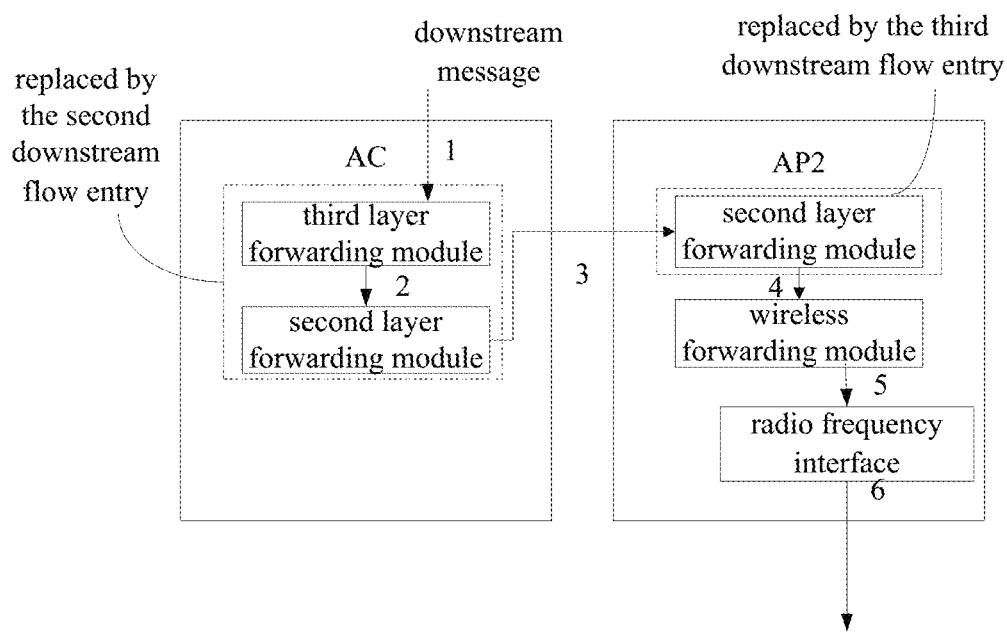
FIG. 10 is a schematic diagram of a locally downstream forwarding process provided by an example of the disclosure.

As shown in FIG. 10, FIG. 10 is an exemplary schematic diagram of a local downstream forwarding process. In the scenario of FIG. 10, the AP2 supports local forwarding, and the second downstream flow entry received by the AC is: an OpenFlow basic matching domain (a destination IP address+a VLAN value+a destination MAC address)+an extended matching domain (an AP identifier)+Output (an AP identifier); the third downstream flow entry received by the AP2 is: an OpenFlow basic matching domain (a destination MAC address)+Output (an identifier of a wireless virtual interface).

Currently, after the AP2 receives the downstream data message, the AP2 may forward the downstream data message based on the sequence of the arrows shown in FIG. 10. In the example of the disclosure, in FIG. 10, the second layer forwarding module and the third layer forwarding module of the AC may be replaced by the second downstream flow entry of the AC, and in FIG. 10, the second layer forwarding module of the AP2 may be replaced by the third downstream flow entry of AP2.

That is, after the AC receives the downstream data message, if the AC determines that a destination IP address, a VLAN value and a destination MAC address in the downstream data message match with the basic matching domain in the second downstream flow entry, and the AC determines, based on the downstream data message, that the AP2 for forwarding the downstream data message is an AP corresponding to the AP identifier in the second downstream flow entry, then the AC determines that the downstream data message matches with the second downstream flow entry, and then the AC forwards the downstream data message to the AP2 based on the second downstream flow entry.

After the AP2 receives the downstream data message, if the AP2 determines that a destination MAC address in the downstream data message is the destination MAC address in the third downstream flow entry stored in the AP2, then the AP2 determines that the downstream data message matches with the third downstream flow entry, and then the AP2 forwards the downstream data message to the terminal via a wireless virtual interface corresponding to the identifier in the third downstream flow entry.

Figure 11:
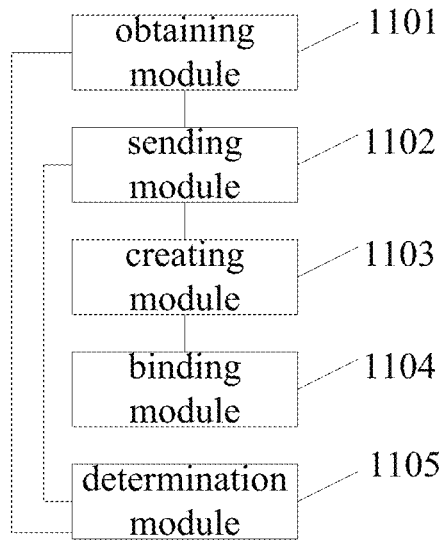
FIG. 11 is a schematic structural diagram of an apparatus for configuring an OpenFlow instance provided by an example of the disclosure.

Corresponding to the example of the method of FIG. 5, an example of the disclosure further provides an apparatus for configuring an OpenFlow instance. The apparatus is applied to an AC. As shown in FIG. 11, the apparatus includes: an obtaining module 1101, a sending module 1102, a creating module 1103 and a binding module 1104.

The obtaining module 1101 is configured to obtain configuration information of a global instance and configuration information of an AP instance corresponding to each AP.

The sending module 1102 is configured to send the configuration information of a corresponding AP instance to each AP, respectively, so that each AP creates an AP instance based on the received configuration information of the AP instance, and bind an AP identifier to the created AP instance.

The creating module 1103 is configured to create the global instance based on the configuration information of the global instance obtained by the obtaining module 1101.

The binding module 1104 is configured to bind an AC identifier and an AP identifier of each AP to the global instance.

Optionally, the apparatus further includes a determination module 1105.

The obtaining module 1101 is configured to receive a first upstream flow entry sent by a software defined network SDN controller, wherein, the first upstream flow entry is used by the AC to perform centralized forwarding on upstream data messages; the first upstream flow entry includes a destination Internet protocol IP address, a virtual local area network VLAN value, a destination media access control MAC address and an identifier of a wireless virtual interface via which a terminal accesses an AP.

The determination module 1105 is configured to, when an upstream data message forwarded by a first AP is received, and a destination IP address, a VLAN value and a destination MAC address included in the upstream data message match respectively with the destination IP address, the VLAN value and the destination MAC address included in the first upstream flow entry, determine whether a wireless virtual interface via which the first AP receives the upstream data message is a wireless virtual interface corresponding to the identifier included in the first upstream flow entry.

The sending module 1102 is configured to, if the wireless virtual interface via which the first AP receives the upstream data message is the wireless virtual interface corresponding to the identifier included in the first upstream flow entry, forward the upstream data message to the destination IP address based on the first upstream flow entry.

The obtaining module 1101 is further configured to receive a first downstream flow entry sent by the SDN controller; wherein, the first downstream flow entry is used by the AC to perform centralized forwarding on downstream data messages; the first downstream flow entry includes a destination IP address, a VLAN value, a destination MAC address and an AP identifier.

The determination module 1105 is further configured to, when a downstream data message is received, and a destination IP address, a VLAN value and a destination MAC address included in the downstream data message match respectively with the destination IP address, the VLAN value and the destination MAC address included in the first downstream flow entry, determine whether the first AP for forwarding the downstream data message is an AP corresponding to the AP identifier in the first downstream flow entry.

Optionally, the sending module 1102 is further configured to, if the first AP for forwarding the downstream data message is the AP corresponding to the AP identifier in the first downstream flow entry, send the downstream data message to the first AP via a wireless interface connected to the first AP based on the first downstream flow entry.

Optionally, the obtaining module 1101 is further configured to receive a second upstream flow entry sent by the SDN controller; wherein, the second upstream flow entry is used by the AC to locally forward upstream data messages; the second upstream flow entry includes a source IP address, a VLAN value, a source MAC address and an AP identifier.

The determination module 1105 is further configured to, when an upstream data message sent by a second AP is received, and a source IP address, a VLAN value and a source MAC address included in the upstream data message match respectively with the source IP address, the VLAN value and the source MAC address included in the second upstream flow entry, determine whether the second AP is an AP corresponding to the AP identifier in the second upstream flow entry.

The sending module 1102 is further configured to, if the second AP is the AP corresponding to the AP identifier in the second upstream flow entry, forward the upstream data message based on the second upstream flow entry.

Optionally, the obtaining module 1101 is further configured to receive a second downstream flow entry sent by the SDN controller; wherein, the second downstream flow entry is used by the AC to locally forward downstream data messages; the second downstream flow entry includes a destination IP address, a VLAN value, a destination MAC address and an AP identifier.

The determination module 1105 is further configured to, when a downstream data message is received, and a destination IP address, a VLAN value and a destination MAC address included in the downstream data message match respectively with the destination IP address, the VLAN value and the destination MAC address included in the second downstream flow entry, determine whether the second AP for forwarding the downstream data message is an AP corresponding to the AP identifier in the second downstream flow entry.

The sending module 1102 is further configured to, if the second AP for forwarding the downstream data message is the AP corresponding to the AP identifier in the second downstream flow entry, send the downstream data message to the second AP based on the second downstream flow entry.

Optionally, the obtaining module 1101 is further configured to receive a third upstream flow entry sent by the SDN controller; wherein, the third upstream flow entry is used by the second AP to locally forward upstream data messages; the third upstream flow entry includes an identifier of a wireless virtual interface; the wireless virtual interface is used by a terminal to access the second AP.

The sending module 1102 is further configured to send the third upstream flow entry to the second AP, so that, when the second AP receives an upstream data message sent by a terminal, and a wireless virtual interface via which the second AP receives the upstream data message is a wireless virtual interface corresponding to the identifier included in the third upstream flow entry, the second AP forwards the upstream data message to the AC based on the third upstream flow entry.

Optionally, the obtaining module 1101 is further configured to receive a third downstream flow entry sent by the SDN controller; wherein, the third downstream flow entry is used by the second AP to locally forward downstream data messages; the third downstream flow entry includes a destination MAC address.

The sending module 1102 is further configured to send the third downstream flow entry to the second AP, so that, when the second AP receives a downstream data message sent by the AC, and a destination MAC address included in the downstream data message is the MAC address included in the third downstream flow entry, the second AP forwards the downstream data message to a terminal based on the third downstream flow entry.

Figure 12:
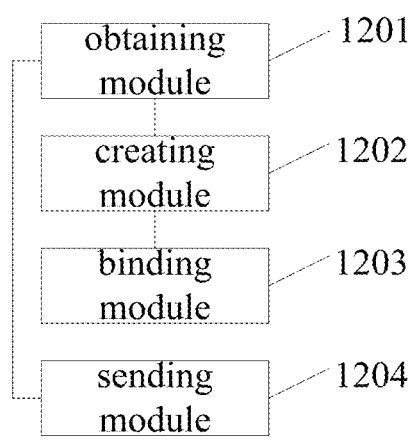
FIG. 12 is a schematic structural diagram of another apparatus for configuring an OpenFlow instance provided by an example of the disclosure.

Corresponding to the example of the method shown in FIG. 6, an example of the disclosure further provides an apparatus for configuring an OpenFlow instance. The apparatus is applied to an AP. As shown in FIG. 12, the apparatus includes: an obtaining module 1201, a creating module 1202 and a binding module 1203.

The obtaining module 1201 is configured to obtain configuration information of an AP instance.

The creating module 1202 is configured to create the AP instance based on the configuration information of the AP instance obtained by the obtaining module 1201.

The binding module 1203 is configured to bind an AP identifier of the AP to the created AP instance.

Optionally, the apparatus further includes: a sending module 1204.

The obtaining module 1201 is further configured to, in the case where the AP supports local forwarding, receive an upstream flow entry sent by an access controller AC; wherein, the upstream flow entry is used by the AP to locally forward upstream data messages; the upstream flow entry includes an identifier of a wireless virtual interface; the wireless virtual interface is used by a terminal to access the AP.

The sending module 1204 is configured to, when an upstream data message sent by the terminal is received, and a wireless virtual interface via which the AP receives the upstream data message is a wireless virtual interface corresponding to the identifier included in the upstream flow entry, forward the upstream data message to the AC based on the upstream flow entry.

Optionally, the obtaining module 1201 is further configured to, in the case where the AP supports local forwarding, receive a downstream flow entry sent by the AC; wherein, the downstream flow entry is used by the AP to locally forward downstream data messages; the downstream flow entry includes a destination media access control MAC address.

The sending module 1204 is further configured to, when a downstream data message sent by the AC is received, and a destination MAC address included in the downstream data message is the destination MAC address in the downstream flow entry, forward the downstream data message to the terminal based on the downstream flow entry.

Figure 13:
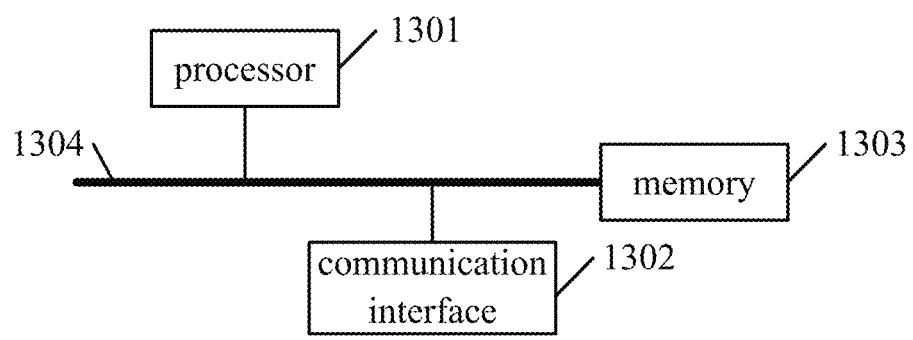
FIG. 13 is a schematic architecture diagram of an AC provided by an example of the disclosure.

An example of the disclosure further provides an AC, as shown in FIG. 13, including a processor 1301, a communication interface 1302, a memory 1303 and a communication bus 1304; wherein, the processor 1301, the communication interface 1302 and the memory 1303 communicate with each other via the communication bus 1304.

The memory 1303 is configured to store a computer program.

The processor 1301 is configured to implement the operations, performed by the AC, in the above example of the method when executing the program stored in the memory 1303.

The communication bus in the above AC may be a peripheral component interconnect (PCI) bus or an extended industry standard architecture (EISA) bus and the like. This communication bus may include an address bus, a data bus, a control bus, or the like. For ease of representation, only one thick line is shown in the figures, which does not represent that there is only one communication bus or one type of communication bus.

The communication interface is used for communication between the above AC and other advices.

The memory may include a random access memory (RAM), or may include a non-volatile memory (NVM), for example at least one disk memory. Optionally, the memory may further be at least a storage apparatus located away from the above processor.

The above processor may be a general-purpose processor, such as a central processing unit (CPU), a network processor (NP), or the like; it may also be a digital signal processor (DSP), an application specific integrated circuit (ASIC), a field-programmable gate array (FPGA) or other programmable logic device, a discrete gate or transistor logic device, a discrete hardware component.

Based on the same technical concept, an example of the disclosure further provides an AC, including a processor and a machine readable storage medium; wherein, the machine readable storage medium stores machine executable instructions executable by the processor, and the processor is caused by the machine executable instructions to:
  obtain configuration information of a global instance and configuration information of an AP instance corresponding to each AP;
  send the configuration information of a corresponding AP instance to each AP respectively, so that each AP creates an AP instance based on the received configuration information of the AP instance, and binds an AP identifier to the created AP instance;
  create the global instance based on the configuration information of the global instance; and
  bind an AC identifier and an AP identifier of each AP to the global instance.

Optionally, the machine executable instructions further cause the processor to:
  receive a first upstream flow entry sent by a software defined network SDN controller; wherein, the first upstream flow entry is used by the AC to perform centralized forwarding on upstream data messages; the first upstream flow entry includes a destination Internet protocol IP address, a virtual local area network VLAN value, a destination media access control MAC address and an identifier of a wireless virtual interface via which a terminal accesses an AP;
  when an upstream data message forwarded by a first AP is received, and a destination IP address, a VLAN value and a destination MAC address included in the upstream data message match respectively with the destination IP address, the VLAN value and the destination MAC address included in the first upstream flow entry, determine whether a wireless virtual interface via which the first AP receives the upstream data message is a wireless virtual interface corresponding to the identifier included in the first upstream flow entry; and
  if the wireless virtual interface via which the first AP receives the upstream data message is the wireless virtual interface corresponding to the identifier included in the first upstream flow entry, forward the upstream data message to the destination IP address based on the first upstream flow entry;
or,
the machine executable instructions further cause the processor to:
  receive a first downstream flow entry sent by the SDN controller; wherein, the first downstream flow entry is used by the AC to perform centralized forwarding on downstream data messages; the first downstream flow entry includes a destination IP address, a VLAN value, a destination MAC address and an AP identifier;
  when a downstream data message is received, and a destination IP address, a VLAN value and a destination MAC address included in the downstream data message match respectively with the destination IP address, the VLAN value and the destination MAC address included in the first downstream flow entry, determine whether the first AP for forwarding the downstream data message is an AP corresponding to the AP identifier in the first downstream flow entry; and
  if the first AP for forwarding the downstream data message is the AP corresponding to the AP identifier in the first downstream flow entry, send the downstream data message to the first AP via a wireless interface connected to the first AP based on the first downstream flow entry.

Optionally, the machine executable instructions further cause the processor to:
  receive a second upstream flow entry sent by the SDN controller; wherein, the second upstream flow entry is used by the AC to locally forward upstream data messages; the second upstream flow entry includes a source IP address, a VLAN value, a source MAC address and an AP identifier;
  when an upstream data message sent by a second AP is received, and a source IP address, a VLAN value and a source MAC address included in the upstream data message match respectively with the source IP address, the VLAN value and the source MAC address included in the second upstream flow entry, determine whether the second AP is an AP corresponding to the AP identifier in the second upstream flow entry; and
  if the second AP is the AP corresponding to the AP identifier in the second upstream flow entry, forward the upstream data message based on the second upstream flow entry;
or,
the machine executable instructions further cause the processor to:
  receive a second downstream flow entry sent by the SDN controller; wherein, the second downstream flow entry is used by the AC to locally forward downstream data messages; the second downstream flow entry includes a destination IP address, a VLAN value, a destination MAC address and an AP identifier;
  when a downstream data message is received, and a destination IP address, a VLAN value and a destination MAC address included in the downstream data message match respectively with the destination IP address, the VLAN value and the destination MAC address included in the second downstream flow entry, determine whether the second AP for forwarding the downstream data message is an AP corresponding to the AP identifier in the second downstream flow entry; and
  if the second AP for forwarding the downstream data message is the AP corresponding to the AP identifier in the second downstream flow entry, send the downstream data message to the second AP based on the second downstream flow entry.

Optionally, the machine executable instructions further cause the processor to:
  receive a third upstream flow entry sent by the SDN controller; wherein, the third upstream flow entry is used by the second AP to locally forward upstream data messages; the third upstream flow entry includes an identifier of a wireless virtual interface; the wireless virtual interface is used by a terminal to access the second AP; and
  send the third upstream flow entry to the second AP, so that, when the second AP receives an upstream data message sent by the terminal, and a wireless virtual interface via which the second AP receives the upstream data message is a wireless virtual interface corresponding to the identifier included in the third upstream flow entry, the second AP forwards the upstream data message to the AC based on the third upstream flow entry;
or,
the machine executable instructions further cause the processor to:
  receive a third downstream flow entry sent by the SDN controller; wherein, the third downstream flow entry is used by the second AP to locally forward downstream data messages; the third downstream flow entry includes a destination MAC address; and send the third downstream flow entry to the second AP, so that, when the second AP receives a downstream data message sent by the AC, and a destination MAC address included in the downstream data message is the MAC address included in the third downstream flow entry, the second AP forwards the downstream data message to the terminal based on the third downstream flow entry.

Based on the same technical concept, an example of the disclosure further provides a machine readable storage medium, which is applicable to an AC and stores machine executable instructions executable by a processor; wherein, the machine executable instructions, when being invoked and executed by the processor, cause the processor to:

obtain configuration information of a global instance and configuration information of an AP instance corresponding to each AP;

send the configuration information of a corresponding AP instance to each AP respectively, so that each AP creates an AP instance based on the received configuration information of the AP instance, and binds an AP identifier to the created AP instance;

create the global instance based on the configuration information of the global instance; and bind an AC identifier and an AP identifier of each AP to the global instance.

Optionally, the machine executable instructions further cause the processor to:

receive a first upstream flow entry sent by a software defined network SDN controller; wherein, the first upstream flow entry is used by the AC to perform centralized forwarding on upstream data messages; the first upstream flow entry includes a destination Internet protocol IP address, a virtual local area network VLAN value, a destination media access control MAC address and an identifier of a wireless virtual interface via which a terminal accesses an AP;

when an upstream data message forwarded by a first AP is received, and a destination IP address, a VLAN value and a destination MAC address included in the upstream data message match respectively with the destination IP address, the VLAN value and the destination MAC address included in the first upstream flow entry, determine whether a wireless virtual interface via which the first AP receives the upstream data message is a wireless virtual interface corresponding to the identifier included in the first upstream flow entry; and if the wireless virtual interface via which the first AP receives the upstream data message is the wireless virtual interface corresponding to the identifier included in the first upstream flow entry, forward the upstream data message to the destination IP address based on the first upstream flow entry;

or, the machine executable instructions further cause the processor to:

receive a first downstream flow entry sent by the SDN controller; wherein, the first downstream flow entry is used by the AC to perform centralized forwarding on downstream data messages; the first downstream flow entry includes a destination IP address, a VLAN value, a destination MAC address and an AP identifier;

when a downstream data message is received, and a destination IP address, a VLAN value and a destination MAC address included in the downstream data message match respectively with the destination IP address, the VLAN value and the destination MAC address included in the first downstream flow entry, determine whether the first AP for forwarding the downstream data message is an AP corresponding to the AP identifier in the first downstream flow entry; and if the first AP for forwarding the downstream data message is the AP corresponding to the AP identifier in the first downstream flow entry, send the downstream data message to the first AP via a wireless interface connected to the first AP based on the first downstream flow entry.

Optionally, the machine executable instructions further cause the processor to:

receive a second upstream flow entry sent by the SDN controller; wherein, the second upstream flow entry is used by the AC to locally forward upstream data messages; the second upstream flow entry includes a source IP address, a VLAN value, a source MAC address and an AP identifier;

when an upstream data message sent by a second AP is received, and a source IP address, a VLAN value and a source MAC address included in the upstream data message match respectively with the source IP address, the VLAN value and the source MAC address included in the second upstream flow entry, determine whether the second AP is an AP corresponding to the AP identifier in the second upstream flow entry; and if the second AP is the AP corresponding to the AP identifier in the second upstream flow entry, forward the upstream data message based on the second upstream flow entry;

or, the machine executable instructions further cause the processor to:

receive a second downstream flow entry sent by the SDN controller; wherein, the second downstream flow entry is used by the AC to locally forward downstream data messages; the second downstream flow entry includes a destination IP address, a VLAN value, a destination MAC address and an AP identifier;

when a downstream data message is received, and a destination IP address, a VLAN value and a destination MAC address included in the downstream data message match respectively with the destination IP address, the VLAN value and the destination MAC address included in the second downstream flow entry, determine whether the second AP for forwarding the downstream data message is an AP corresponding to the AP identifier in the second downstream flow entry; and if the second AP for forwarding the downstream data message is the AP corresponding to the AP identifier in the second downstream flow entry, send the downstream data message to the second AP based on the second downstream flow entry.

Optionally, the machine executable instructions further cause the processor to:

receive a third upstream flow entry sent by the SDN controller; wherein, the third upstream flow entry is used by the second AP to locally forward upstream data messages; the third upstream flow entry includes an identifier of a wireless virtual interface; the wireless virtual interface is used by a terminal to access the second AP; and send the third upstream flow entry to the second AP, so that, when the second AP receives an upstream data message sent by the terminal, and a wireless virtual interface via which the second AP receives the upstream data message is a wireless virtual interface corresponding to the identifier included in the third upstream flow entry, the second AP forwards the upstream data message to the AC based on the third upstream flow entry;

or, the machine executable instructions further cause the processor to:

receive a third downstream flow entry sent by the SDN controller; wherein, the third downstream flow entry is used by the second AP to locally forward downstream data messages; the third downstream flow entry includes a destination MAC address; and send the third downstream flow entry to the second AP, so that, when the second AP receives a downstream data message sent by the AC, and a destination MAC address included in the downstream data message is the MAC address included in the third downstream flow entry, the second AP forwards the downstream data message to the terminal based on the third downstream flow entry.

Based on the same technical concept, an example of the disclosure further provides machine executable instructions, which may be stored in a machine readable storage medium and may be applicable to an AC; wherein, the machine executable instructions, when being invoked and executed by a processor, cause the processor to:

obtain configuration information of a global instance and configuration information of an AP instance corresponding to each AP;

send the configuration information of a corresponding AP instance to each AP respectively, so that each AP creates an AP instance based on the received configuration information of the AP instance, and binds an AP identifier to the created AP instance;

create the global instance based on the configuration information of the global instance; and bind an AC identifier and an AP identifier of each AP to the global instance.

Optionally, the machine executable instructions further cause the processor to:

receive a first upstream flow entry sent by a software defined network SDN controller; wherein, the first upstream flow entry is used by the AC to perform centralized forwarding on upstream data messages; the first upstream flow entry includes a destination Internet protocol IP address, a virtual local area network VLAN value, a destination media access control MAC address and an identifier of a wireless virtual interface via which a terminal accesses an AP;

when an upstream data message forwarded by a first AP is received, and a destination IP address, a VLAN value and a destination MAC address included in the upstream data message match respectively with the destination IP address, the VLAN value and the destination MAC address included in the first upstream flow entry, determine whether a wireless virtual interface via which the first AP receives the upstream data message is a wireless virtual interface corresponding to the identifier included in the first upstream flow entry; and if the wireless virtual interface via which the first AP receives the upstream data message is the wireless virtual interface corresponding to the identifier included in the first upstream flow entry, forward the upstream data message to the destination IP address based on the first upstream flow entry;

or, the machine executable instructions further cause the processor to:

receive a first downstream flow entry sent by the SDN controller; wherein, the first downstream flow entry is used by the AC to perform centralized forwarding on downstream data messages; the first downstream flow entry includes a destination IP address, a VLAN value, a destination MAC address and an AP identifier;

when a downstream data message is received, and a destination IP address, a VLAN value and a destination MAC address included in the downstream data message match respectively with the destination IP address, the VLAN value and the destination MAC address included in the first downstream flow entry, determine whether the first AP for forwarding the downstream data message is an AP corresponding to the AP identifier in the first downstream flow entry; and if the first AP for forwarding the downstream data message is the AP corresponding to the AP identifier in the first downstream flow entry, send the downstream data message to the first AP via a wireless interface connected to the first AP based on the first downstream flow entry.

Optionally, the machine executable instructions further cause the processor to:

receive a second upstream flow entry sent by the SDN controller; wherein, the second upstream flow entry is used by the AC to locally forward upstream data messages; the second upstream flow entry includes a source IP address, a VLAN value, a source MAC address and an AP identifier;

when an upstream data message sent by a second AP is received, and a source IP address, a VLAN value and a source MAC address included in the upstream data message match respectively with the source IP address, the VLAN value and the source MAC address included in the second upstream flow entry, determine whether the second AP is an AP corresponding to the AP identifier in the second upstream flow entry; and if the second AP is the AP corresponding to the AP identifier in the second upstream flow entry, forward the upstream data message based on the second upstream flow entry;

or, the machine executable instructions further cause the processor to:

receive a second downstream flow entry sent by the SDN controller; wherein, the second downstream flow entry is used by the AC to locally forward downstream data messages; the second downstream flow entry includes a destination IP address, a VLAN value, a destination MAC address and an AP identifier;

when a downstream data message is received, and a destination IP address, a VLAN value and a destination MAC address included in the downstream data message match respectively with the destination IP address, the VLAN value and the destination MAC address included in the second downstream flow entry, determine whether the second AP for forwarding the downstream data message is an AP corresponding to the AP identifier in the second downstream flow entry; and if the second AP for forwarding the downstream data message is the AP corresponding to the AP identifier in the second downstream flow entry, send the downstream data message to the second AP based on the second downstream flow entry.

Optionally, the machine executable instructions further cause the processor to:

receive a third upstream flow entry sent by the SDN controller; wherein, the third upstream flow entry is used by the second AP to locally forward upstream data messages; the third upstream flow entry includes an identifier of a wireless virtual interface; the wireless virtual interface is used by a terminal to access the second AP; and send the third upstream flow entry to the second AP, so that, when the second AP receives an upstream data message sent by the terminal, and a wireless virtual interface via which the second AP receives the upstream data message is a wireless virtual interface corresponding to the identifier included in the third upstream flow entry, the second AP forwards the upstream data message to the AC based on the third upstream flow entry;

or, the machine executable instructions further cause the processor to:

receive a third downstream flow entry sent by the SDN controller; wherein, the third downstream flow entry is used by the second AP to locally forward downstream data messages; the third downstream flow entry includes a destination MAC address; and send the third downstream flow entry to the second AP, so that, when the second AP receives a downstream data message sent by the AC, and a destination MAC address included in the downstream data message is the MAC address included in the third downstream flow entry, the second AP forwards the downstream data message to the terminal based on the third downstream flow entry.

Figure 14:
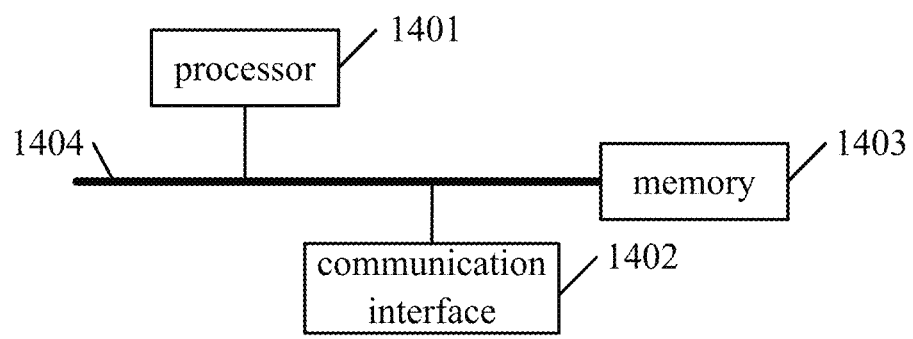
FIG. 14 is a schematic architecture diagram of an AP provided by an example of the disclosure.

An example of the disclosure further provides an AP, as shown in FIG. 14, including a processor 1401, a communication interface 1402, a memory 1403 and a communication bus 1404; wherein, the processor 1401, the communication interface 1402 and the memory 1403 communicate with each other via the communication bus 1404.

The memory 1403 is configured to store a computer program.

The processor 1401 is configured to implement the operations performed by the AP in the above example of the method when executing the program stored in the memory 1403.

The communication bus in the above AP may be a peripheral component interconnect (PCI) bus or an extended industry standard architecture (EISA) bus and the like. This communication bus may include an address bus, a data bus, a control bus, or the like. For ease of representation, only one thick line is shown in the figures, which does not represent that there is only one communication bus or one type of communication bus.

The communication interface is used for communication between the above AP and other advices.

The memory may include a random access memory (RAM), or may include a non-volatile memory (NVM), for example at least one disk memory. Optionally, the memory may further be at least a storage apparatus located away from the above processor.

The above processor may be a general-purpose processor, such as a central processing unit (CPU), a network processor (NP), or the like; it may also be a digital signal processor (DSP), an application specific integrated circuit (ASIC), a field-programmable gate array (FPGA) or other programmable logic device, a discrete gate or transistor logic device, a discrete hardware component.

Based on the same technical concept, an example of the disclosure further provides an AP, including: a processor and a machine readable storage medium; wherein, the machine readable storage medium stores machine executable instructions executable by the processor, and the processor is caused by the machine executable instructions to:

obtain configuration information of an AP instance;

create the AP instance based on the configuration information of the AP instance; and bind an AP identifier of the AP to the created AP instance.

Optionally, the machine executable instructions cause the processor to:

receive an upstream flow entry sent by an access controller AC in a case where the AP supports local forwarding; wherein, the upstream flow entry is used by the AP to locally forward upstream data messages; the upstream flow entry includes an identifier of a wireless virtual interface; the wireless virtual interface is used by a terminal to access the AP; and when an upstream data message sent by the terminal is received, and a wireless virtual interface via which the AP receives the upstream data message is a wireless virtual interface corresponding to the identifier included in the upstream flow entry, forward the upstream data message to the AC based on the upstream flow entry;

or, the machine executable instructions cause the processor to:

receive a downstream flow entry sent by the AC in a case where the AP supports local forwarding; wherein, the downstream flow entry is used by the AP to locally forward downstream data messages; the downstream flow entry includes a destination media access control MAC address; and when a downstream data message sent by the AC is received, and a destination MAC address included in the downstream data message is the destination MAC address in the downstream flow entry, forward the downstream data message to the terminal based on the downstream flow entry.

Based on the same technical concept, an example of the disclosure further provides a machine readable storage medium, which may be applicable to an AP and stores machine executable instructions executable by a processor; wherein, the machine executable instructions, when being invoked and executed by the processor, cause the processor to:

obtain configuration information of an AP instance;

create the AP instance based on the configuration information of the AP instance; and bind an AP identifier of the AP to the created AP instance.

Optionally, the machine executable instructions cause the processor to:

receive an upstream flow entry sent by an access controller AC in a case where the AP supports local forwarding; wherein, the upstream flow entry is used by the AP to locally forward upstream data messages; the upstream flow entry includes an identifier of a wireless virtual interface; the wireless virtual interface is used by a terminal to access the AP; and when an upstream data message sent by the terminal is received, and a wireless virtual interface via which the AP receives the upstream data message is a wireless virtual interface corresponding to the identifier included in the upstream flow entry, forward the upstream data message to the AC based on the upstream flow entry;

or, the machine executable instructions cause the processor to:

receive a downstream flow entry sent by the AC in a case where the AP supports local forwarding; wherein, the downstream flow entry is used by the AP to locally forward downstream data messages; the downstream flow entry includes a destination media access control MAC address; and when a downstream data message sent by the AC is received, and a destination MAC address included in the downstream data message is the destination MAC address in the downstream flow entry, forward the downstream data message to the terminal based on the downstream flow entry.

Based on the same technical concept, an example of the disclosure further provides machine executable instructions, which may be stored in a machine readable storage medium and may be applicable to an AP; wherein, the machine executable instructions, when being invoked and executed by a processor, cause the processor to:

obtain configuration information of an AP instance;

create the AP instance based on the configuration information of the AP instance; and bind an AP identifier of the AP to the created AP instance.

Optionally, the machine executable instructions cause the processor to:

receive an upstream flow entry sent by an access controller AC in a case where the AP supports local forwarding; wherein, the upstream flow entry is used by the AP to locally forward upstream data messages; the upstream flow entry includes an identifier of a wireless virtual interface; the wireless virtual interface is used by a terminal to access the AP; and when an upstream data message sent by the terminal is received, and a wireless virtual interface via which the AP receives the upstream data message is a wireless virtual interface corresponding to the identifier included in the upstream flow entry, forward the upstream data message to the AC based on the upstream flow entry;

or, the machine executable instructions cause the processor to:

receive a downstream flow entry sent by the AC in a case where the AP supports local forwarding; wherein, the downstream flow entry is used by the AP to locally forward downstream data messages; the downstream flow entry includes a destination media access control MAC address; and when a downstream data message sent by the AC is received, and a destination MAC address included in the downstream data message is the destination MAC address in the downstream flow entry, forward the downstream data message to the terminal based on the downstream flow entry.

The above examples may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions based on examples of the disclosure are implemented in whole or in part. The computer may be a general purpose computer, a special purpose computer, a computer network, or other programmable apparatus. Computer instructions may be stored in a computer readable storage medium or transmitted from one computer readable storage medium to another computer readable storage medium. For example, the computer instructions may be transmitted from a website site, computer, server or data center to another website site, computer, server or data center by a wired manner (for example, coaxial-cable, fiber, digital subscriber line (DSL)) or a wireless manner (for example, infrared, wireless, microwave, etc.). The computer readable storage medium may be any available medium that can be accessed by a computer or may be a data storage device, such as a server, data center, or the like, including one or more integrated available mediums. The available mediums may be a magnetic medium (for example, a floppy disk, a hard disk, a magnetic tape), an optical medium (for example, DVD), or a semiconductor medium (for example, a Solid State Disk (SSD)), etc.

It should be noted that the relationship terms used herein, such as "first", "second" and the like are only to distinguish one entity or operation from another entity or operation, but do not necessarily require or imply that there is an actual relationship or order between these entities or operations. Moreover, the terms "include", "comprise", or any variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the examples in the description are described in a correlated manner, and identical or similar parts in various examples can refer to one another. In addition, the description for each example focuses on the differences from other examples. In particular, the example of the apparatus is described briefly, since it is substantially similar to the example of the method, and the related contents can refer to the description of the example of the method.

The above described examples are only preferable examples of the disclosure, and are not intended to limit the scope of protection of the disclosure. Any modifications, alternatives, improvements, or the like within the spirit and principle of the disclosure shall be included within the scope of protection of the disclosure.

The invention claimed is:

1. A method for configuring an OpenFlow instance, which is applicable to an access controller (AC), wherein at least one access point (AP) accesses the AC, and the method comprises:

obtaining configuration information of a global instance and configuration information of an AP instance corresponding to each AP;

sending the configuration information of a corresponding AP instance to each AP respectively, so that each AP creates the AP instance based on received configuration information of the AP instance, and binds an AP identifier to the created AP instance;

creating the global instance based on the configuration information of the global instance; and binding an AC identifier and the AP identifier of each AP to the global instance, wherein a wireless virtual interface created by the AP is bound to the AP instance, such that when the wireless virtual interface of the AP changes, it is not needed to re-configure the AP instance.

2. The method of claim 1, wherein, the method further comprises:
receiving a first upstream flow entry sent by a software defined network (SDN) controller; wherein, the first upstream flow entry is used by the AC to perform centralized forwarding on upstream data messages; the first upstream flow entry comprises a destination Internet protocol (IP) address, a virtual local area network (VLAN) value, a destination media access control (MAC) address and an identifier of a wireless virtual interface via which a terminal accesses an AP;
when an upstream data message forwarded by a first AP is received, and a destination IP address, a VLAN value and a destination MAC address comprised in the upstream data message match respectively with the destination IP address, the VLAN value and the destination MAC address comprised in the first upstream flow entry, determining whether a wireless virtual interface via which the first AP receives the upstream data message is a wireless virtual interface corresponding to the identifier comprised in the first upstream flow entry; and
if the wireless virtual interface via which the first AP receives the upstream data message is the wireless virtual interface corresponding to the identifier comprised in the first upstream flow entry, forwarding the upstream data message to the destination IP address based on the first upstream flow entry;

or,
wherein the method further comprises:
receiving a first downstream flow entry sent by the SDN controller; wherein, the first downstream flow entry is used by the AC to perform centralized forwarding on downstream data messages; the first downstream flow entry comprises a destination IP address, a VLAN value, a destination MAC address and an AP identifier;
when a downstream data message is received, and a destination IP address, a VLAN value and a destination MAC address comprised in the downstream data message match respectively with the destination IP address, the VLAN value and the destination MAC address comprised in the first downstream flow entry, determining whether the first AP for forwarding the downstream data message is an AP corresponding to the AP identifier in the first downstream flow entry; and
if the first AP for forwarding the downstream data message is the AP corresponding to the AP identifier in the first downstream flow entry, sending the downstream data message to the first AP via a wireless interface connected to the first AP based on the first downstream flow entry.

3. The method of claim 1, wherein, the method further comprises:
receiving a second upstream flow entry sent by a SDN controller; wherein, the second upstream flow entry is used by the AC to locally forward upstream data messages; the second upstream flow entry comprises a source IP address, a VLAN value, a source MAC address and an AP identifier;
when an upstream data message sent by a second AP is received, and a source IP address, a VLAN value and a source MAC address comprised in the upstream data message match respectively with the source IP address, the VLAN value and the source MAC address comprised in the second upstream flow entry, determining whether the second AP is an AP corresponding to the AP identifier in the second upstream flow entry; and
if the second AP is the AP corresponding to the AP identifier in the second upstream flow entry, forwarding the upstream data message based on the second upstream flow entry;

or,
wherein the method further comprises:
receiving a second downstream flow entry sent by the SDN controller; wherein, the second downstream flow entry is used by the AC to locally forward downstream data messages; the second downstream flow entry comprises a destination IP address, a VLAN value, a destination MAC address and an AP identifier;
when a downstream data message is received, and a destination IP address, a VLAN value and a destination MAC address comprised in the downstream data message match respectively with the destination IP address, the VLAN value and the destination MAC address comprised in the second downstream flow entry, determining whether the second AP for forwarding the downstream data message is an AP corresponding to the AP identifier in the second downstream flow entry; and
if the second AP for forwarding the downstream data message is the AP corresponding to the AP identifier in the second downstream flow entry, sending the downstream data message to the second AP based on the second downstream flow entry.

4. The method of claim 1, wherein, the method further comprises:
receiving a third upstream flow entry sent by a SDN controller; wherein, the third upstream flow entry is used by a second AP to locally forward upstream data messages; the third upstream flow entry comprises an identifier of a wireless virtual interface; the wireless virtual interface is used by a terminal to access the second AP; and
sending the third upstream flow entry to the second AP, so that, when the second AP receives an upstream data message sent by the terminal, and a wireless virtual interface via which the second AP receives the upstream data message is a wireless virtual interface corresponding to the identifier comprised in the third upstream flow entry, the second AP forwards the upstream data message to the AC based on the third upstream flow entry;

or,
wherein the method further comprises:
receiving a third downstream flow entry sent by the SDN controller; wherein, the third downstream flow entry is used by the second AP to locally forward downstream data messages; the third downstream flow entry comprises a destination MAC address; and
sending the third downstream flow entry to the second AP, so that, when the second AP receives a downstream data message sent by the AC, and a destination MAC address comprised in the downstream data message is the destination MAC address comprised in the third downstream flow entry, the second AP forwards the downstream data message to a terminal based on the third downstream flow entry.

5. A method for configuring an OpenFlow instance, which is applicable to an access point (AP), comprising:
obtaining configuration information of an AP instance;
creating the AP instance based on the configuration information of the AP instance; and
binding an AP identifier of the AP to the created AP instance, wherein a wireless virtual interface created by the AP is bound to the AP instance, such that when the wireless virtual interface of the AP changes, it is not needed to re-configure the AP instance.

6. The method of claim 5, wherein the method further comprises:
receiving an upstream flow entry sent by an access controller (AC) in a case where the AP supports local forwarding; wherein, the upstream flow entry is used by the AP to locally forward upstream data messages; the upstream flow entry comprises an identifier of a wireless virtual interface; the wireless virtual interface is used by a terminal to access the AP; and
when an upstream data message sent by the terminal is received, and a wireless virtual interface via which the AP receives the upstream data message is a wireless virtual interface corresponding to the identifier comprised in the upstream flow entry, forwarding the upstream data message to the AC based on the upstream flow entry;

or,
wherein the method further comprises:
receiving a downstream flow entry sent by the AC in a case where the AP supports local forwarding; wherein, the downstream flow entry is used by the AP to locally forward downstream data messages; the downstream flow entry comprises a destination media access control (MAC) address; and
when a downstream data message sent by the AC is received, and a destination MAC address comprised in the downstream data message is the destination MAC address in the downstream flow entry, forwarding the downstream data message to a terminal based on the downstream flow entry.

7. An access controller AC, comprising a processor and a machine readable storage medium; wherein, the machine readable storage medium stores machine executable instructions executable by the processor, and the machine executable instructions cause the processor to:
obtain configuration information of a global instance and configuration information of an access point AP instance corresponding to each AP;
send the configuration information of a corresponding AP instance to each AP respectively, so that each AP creates an AP instance based on received configuration information of the AP instance, and binds an AP identifier to the created AP instance;
create the global instance based on the configuration information of the global instance; and
bind an AC identifier and an AP identifier of each AP to the global instance, wherein a wireless virtual interface created by the AP is bound to the AP instance, such that when the wireless virtual interface of the AP changes, it is not needed to re-configure the AP instance.

8. The AC of claim 7, wherein, the machine executable instructions further cause the processor to:
receive a first upstream flow entry sent by a software defined network (SDN) controller; wherein, the first upstream flow entry is used by the AC to perform centralized forwarding on upstream data messages; the first upstream flow entry comprises a destination Internet protocol (IP) address, a virtual local area network (VLAN) value, a destination media access control (MAC) address and an identifier of a wireless virtual interface via which a terminal accesses an AP;
when an upstream data message forwarded by a first AP is received, and a destination IP address, a VLAN value and a destination MAC address comprised in the upstream data message match respectively with the destination IP address, the VLAN value and the destination MAC address comprised in the first upstream flow entry, determine whether a wireless virtual interface via which the first AP receives the upstream data message is a wireless virtual interface corresponding to the identifier comprised in the first upstream flow entry; and
if the wireless virtual interface via which the first AP receives the upstream data message is the wireless virtual interface corresponding to the identifier comprised in the first upstream flow entry, forward the upstream data message to the destination IP address based on the first upstream flow entry;

or,
wherein the machine executable instructions further cause the processor to:
receive a first downstream flow entry sent by the SDN controller; wherein, the first downstream flow entry is used by the AC to perform centralized forwarding on downstream data messages; the first downstream flow entry comprises a destination IP address, a VLAN value, a destination MAC address and an AP identifier;
when a downstream data message is received, and a destination IP address, a VLAN value and a destination MAC address comprised in the downstream data message match respectively with the destination IP address, the VLAN value and the destination MAC address comprised in the first downstream flow entry, determine whether the first AP for forwarding the downstream data message is an AP corresponding to the AP identifier in the first downstream flow entry; and
if the first AP for forwarding the downstream data message is the AP corresponding to the AP identifier in the first downstream flow entry, send the downstream data message to the first AP via a wireless interface connected to the first AP based on the first downstream flow entry.

9. The AC of claim 7, wherein, the machine executable instructions further cause the processor to:
receive a second upstream flow entry sent by a SDN controller; wherein, the second upstream flow entry is used by the AC to locally forward upstream data messages; the second upstream flow entry comprises a source IP address, a VLAN value, a source MAC address and an AP identifier;
when an upstream data message sent by a second AP is received, and a source IP address, a VLAN value and a source MAC address comprised in the upstream data message match respectively with the source IP address, the VLAN value and the source MAC address comprised in the second upstream flow entry, determine whether the second AP is an AP corresponding to the AP identifier in the second upstream flow entry; and
if the second AP is the AP corresponding to the AP identifier in the second upstream flow entry, forward the upstream data message based on the second upstream flow entry;

or, wherein the machine executable instructions further cause the processor to:

receive a second downstream flow entry sent by the SDN controller; wherein, the second downstream flow entry is used by the AC to locally forward downstream data messages; the second downstream flow entry comprises a destination IP address, a VLAN value, a destination MAC address and an AP identifier;

when a downstream data message is received, and a destination IP address, a VLAN value and a destination MAC address comprised in the downstream data message match respectively with the destination IP address, the VLAN value and the destination MAC address comprised in the second downstream flow entry, determine whether the second AP for forwarding the downstream data message is an AP corresponding to the AP identifier in the second downstream flow entry; and if the second AP for forwarding the downstream data message is the AP corresponding to the AP identifier in the second downstream flow entry, send the downstream data message to the second AP based on the second downstream flow entry.

10. The AC of claim 7, wherein, the machine executable instructions further cause the processor to:

receive a third upstream flow entry sent by a SDN controller; wherein, the third upstream flow entry is used by a second AP to locally forward upstream data messages; the third upstream flow entry comprises an identifier of a wireless virtual interface; the wireless virtual interface is used by a terminal to access the second AP; and send the third upstream flow entry to the second AP, so that, when the second AP receives an upstream data message sent by the terminal, and a wireless virtual interface via which the second AP receives the upstream data message is a wireless virtual interface corresponding to the identifier comprised in the third upstream flow entry, the second AP forwards the upstream data message to the AC based on the third upstream flow entry;

or, wherein the machine executable instructions further cause the processor to:

receive a third downstream flow entry sent by the SDN controller; wherein, the third downstream flow entry is used by the second AP to locally forward downstream data messages; the third downstream flow entry comprises a destination MAC address; and send the third downstream flow entry to the second AP, so that, when the second AP receives a downstream data message sent by the AC, and a destination MAC address comprised in the downstream data message is the destination MAC address comprised in the third downstream flow entry, the second AP forwards the downstream data message to a terminal based on the third downstream flow entry.

11. An access point AP, comprising a processor and a machine readable storage medium; wherein, the machine readable storage medium stores machine executable instructions executable by the processor, and the machine executable instructions cause the processor to implement the method of claim 5.

12. A non-transitory machine readable storage medium storing machine executable instructions; wherein, the machine executable instructions, when being invoked and executed by a processor, cause the processor to implement the method of claim 1.

13. A non-transitory machine readable storage medium storing machine executable instructions; wherein, the machine executable instructions, when being invoked and executed by a processor, cause the processor to implement the method of claim 5.

* * * * *